(12) United States Patent
Kune et al.

(10) Patent No.: US 7,936,878 B2
(45) Date of Patent: May 3, 2011

(54) SECURE WIRELESS INSTRUMENTATION NETWORK SYSTEM

(75) Inventors: Denis Foo Kune, St. Paul, MN (US); Patrick S. Gonia, Maplewood, MN (US); Thomas L. Phinney, Glendale, AZ (US); Joseph John Kimball, Columbia, MO (US)

(73) Assignee: Honeywell International Inc., Morristown, NJ (US)

( * ) Notice: Subject to any disclaimer, the term of this patent is extended or adjusted under 35 U.S.C. 154(b) by 837 days.

(21) Appl. No.: 11/869,627

(22) Filed: Oct. 9, 2007

(65) Prior Publication Data

US 2008/0130902 A1 Jun. 5, 2008

Related U.S. Application Data

(63) Continuation-in-part of application No. 11/279,235, filed on Apr. 10, 2006.

(51) Int. Cl.
*H04K 1/00* (2006.01)
*H04L 9/00* (2006.01)

(52) U.S. Cl. .......................... 380/270; 380/277; 713/168

(58) Field of Classification Search .................. 380/255, 380/270, 277–279, 45, 281, 284; 713/150, 713/163, 168, 171, 189; 726/26–27
See application file for complete search history.

(56) References Cited

U.S. PATENT DOCUMENTS

| 5,136,643 A | 8/1992 | Fischer |
| 5,325,434 A | 6/1994 | Spaanderman et al. |
| 6,097,812 A | 8/2000 | Friedman |
| 6,148,342 A | 11/2000 | Ho |
| 7,072,587 B2 | 7/2006 | Dietz et al. |
| 7,599,497 B2 * | 10/2009 | Soppera ........................ 380/279 |
| 2004/0208632 A1 | 10/2004 | Dietz et al. |
| 2005/0010818 A1 | 1/2005 | Paff et al. |

FOREIGN PATENT DOCUMENTS

| EP | 1379052 | 1/2004 |
| EP | 1450233 | 8/2004 |

(Continued)

OTHER PUBLICATIONS

Lowe, "Breaking and Fixing the Needham-Schroeder Public-Key Protocol Using FDR," 20 pages, prior to Oct. 9, 2007.

(Continued)

*Primary Examiner* — Hosuk Song
(74) *Attorney, Agent, or Firm* — Seager, Tufte & Wickhem LLC

(57) ABSTRACT

The present system having a secure wireless infrastructure with a key server acting as a key distribution center. The key server may be the core of the network, securely admitting new nodes or devices, deploying and updating keys and authorizing secure communications sessions. The system may also share secure keying information with a new device not already a member of a secure wireless network. The keying information may be used for authentication or encryption or both, and may be provided to the new device in a manner or mode which is not susceptible to exposure outside of the secure network. The keying information shared with the new device may be regarded as a birth key. Then the new device may send a birth key encrypted request to join the secure network via an exposed communication mode. The key server may respond with a birth key encrypted key encryption key.

25 Claims, 8 Drawing Sheets

FOREIGN PATENT DOCUMENTS

| | | |
|---|---|---|
| EP | 1705854 | 9/2006 |
| WO | 2007042345 | 4/2007 |
| WO | 2007133298 | 11/2007 |

OTHER PUBLICATIONS

Needham et al., "Using Encryption for Authentication in Large Networks of Computers," Communications of the ACM, vol. 21, No. 12, pp. 993-999, Dec. 1978.

Otway et al., "Efficient and Timely Mutual Authentication," ACM Operating Systems and Review, vol. 21, No. 1, 3 pages, Jan. 1987.

Schneier, Applied Cryptography Second Edition, Chapter 8, Key Management, pp. 176-177, 1996.

Universal Mobile Telecommunications System, (UMTS); Generic Authentication Architecture (GAA), Generic Bootstrapping Architecture, (3GPP TS 33.220 Version 6.3.0 Release 6), Technical Specification, 40 pages, Dec. 2004.

Zigbee Document 053474r07 Version 1.1, 396 pages, Sep. 5, 2005. This Document Will Be Provided By U.S. Mail.

Barnett et al., "A Secure Framework for Wireless Sensor Networks," 9 pages, 2007.

* cited by examiner

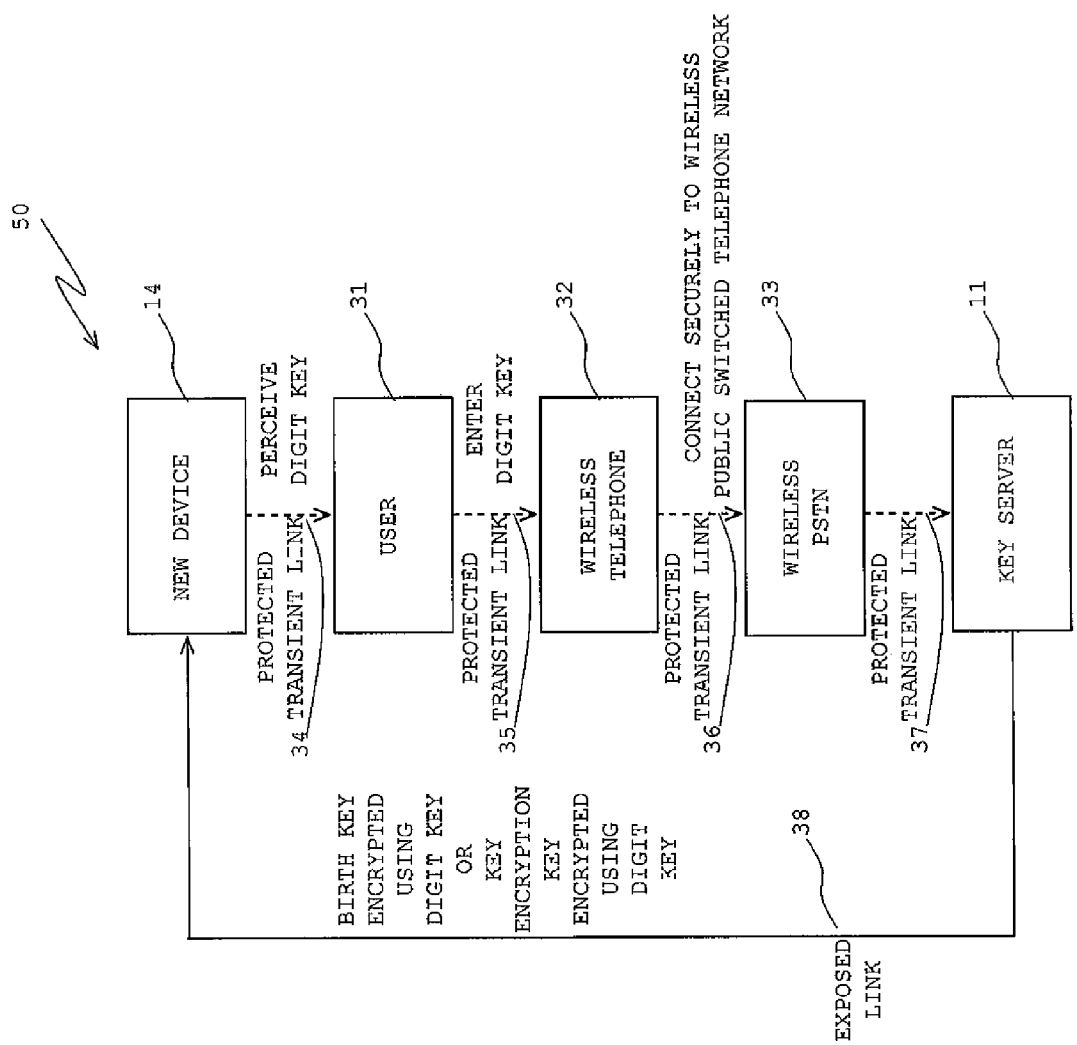

SECURE WIRELESS INSTRUMENTATION NETWORK SYSTEM

The present application is a continuation-in-part of U.S. patent application Ser. No. 11/279,235, filed Apr. 10, 2006.

The U.S. Government may have certain rights in the present invention.

BACKGROUND

The present invention pertains to wireless networks, and particularly to secure wireless networks. More particularly, the invention pertains to authorization aspects of introducing new entities into secure wireless networks.

SUMMARY

The present system may have a secure wireless infrastructure with a key server acting as a key distribution center. The key server may be the core of the network, securely admitting new nodes, deploying and updating keys and authorizing secure communications sessions. The present invention may continue to sustain security by including sharing a secret birth key between the key server and a newly installed device. An approach may assume that the installer has a personal digital assistant, keyfob, liaison device, or the like, that is trusted by the key server. There may be several related options for providing the key.

BRIEF DESCRIPTION OF THE DRAWING

FIGS. 4, 5, 6, 7 and 8 are schematics of illustrative examples of approaches for incorporating a new device into a secure communications system.

DESCRIPTION

Figure 1:
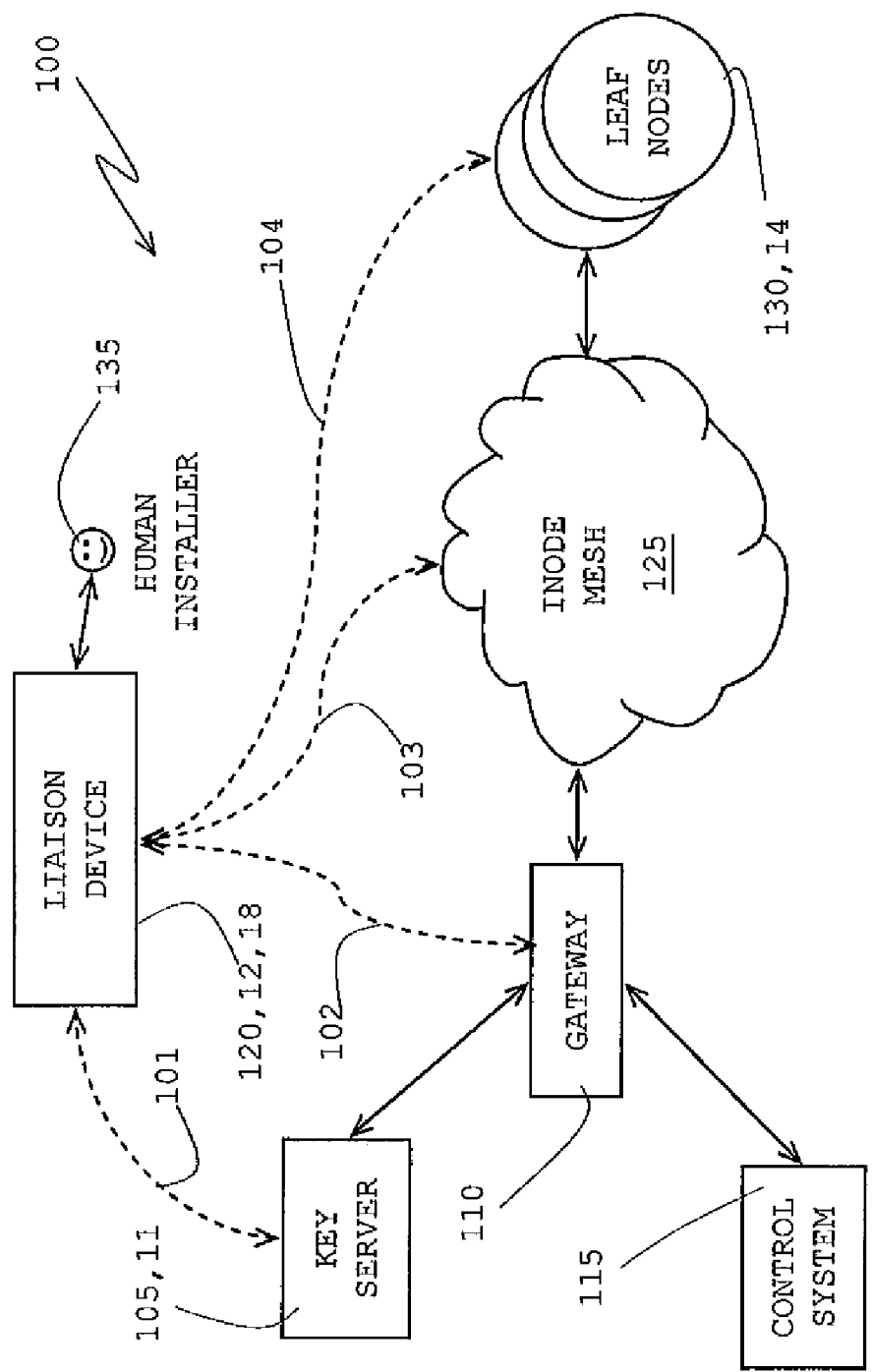
FIG. 1 is a block diagram of a wireless instrumentation network utilizing the network components.

Wired sensors and actuators, known generically as instrumentation, have been used in many applications. One application for wired instrumentation networks has been industrial monitoring. A wired sensor or actuator may be used to monitor or control machinery that would not be easily accessible by a technician. However, wired instrumentation may bring a set of inherent drawbacks, most notably lack of portability and the expense and difficulty of installing wiring. Sensor research has recently turned towards the use of wireless sensors in place of new wired sensors.

A key objective of wireless instrumentation development has been the design of wireless solutions appropriate for the above described industrial sensing, monitoring and control applications. These solutions aim to make the wireless instrumentation communications reliable enough in an industrial setting so that existing wired instrumentation may be replaced by wireless instrumentation. This change should be transparent to the sensing or control application, which means that wireless devices need to be effectively integrated and wireless communications need to be approximately as good as wired communications.

Several critical to quality (CTQ) factors for designing these wireless communications between the instrumentation and the control center may be identified via voice of the customer analysis. These CTQ's may include, but are not limited to, reliability, scalability, low-power consumption, low integration cost, security, auto-configuration, latency, easy maintenance, integration/compatibility and an agreed upon communications standard.

Some of the CTQ's may be described in the following. As to reliability, wireless communications appear to be inherently unreliable due to fluctuation of RF signal strengths and due to interference. The customer, however, should require the wireless communications to have reliability—"as good as a wire".

As to scalability, a system should be highly scalable, handling thousands of instruments without requiring system re-configuration.

As to low power, power consumption should be low enough in battery-powered devices to enable service intervals greater than three years.

As to low cost, an overall system cost and installation cost should be less than one-half of the equivalent wiring installation cost. As to security, the system should be highly secure against attacks such as spoofing and eavesdropping.

As to auto-configuration, the system and device installation should be extremely easy—"plunk and play". As to latency, instrumentation message delivery should have controlled maximum latency. As to maintenance, the system should be easy to maintain, and system diagnostics should be provided for easy problem detection and repair.

As to integration and compatibility, the system should be interoperable with a diverse set of device types, such as sensors, actuators and liaison devices, integrated into existing control systems. As to the communications standard, the wireless system should be capable of becoming a defacto standard, at least at the air interface to the wireless device.

The present system may have a secure wireless infrastructure with a key server acting as a key distribution center. The key server may be the core of the network, securely admitting new nodes, deploying and updating keys, authentications, certificates, and/or the like, and authorizing any secure communications sessions. The terms secure, secured, and/or the like, may mean secret, confidential, and/or mean not to be available to outsiders of the secure or secured network, or to parties which are not members of the individual specific security relationships. Building an infrastructure around the key server may provide for a protocol with an added feature such that centralized policies and software updates can be pushed from one single source. The capabilities of the key server may permit simplification of other nodes in the wireless network and of the security aspects of the communication protocol(s) that they share. This simplification may also act to reduce the energy requirements of the other nodes, which may be battery-powered and wireless.

In an illustrative example, a secure or secured network may start with a key server. Mobile liaison devices may be bound to the key server. These liaison devices may act as intermediaries between the key server and new instrumentation nodes in the infrastructure. The liaison devices may carry cryptographic information from the key server to new instrumentation nodes that are not actively participating in the secured network. When a new instrumentation node or device is added to the network, a liaison device may pass cryptographic keying information from the key server to the new instrumentation node. The instrumentation node may use this keying information to authenticate itself to the key server and securely exchange a key. A secure or secured network may have members (e.g., devices) that can have secure communications among themselves. Devices that do not share authentication keys for such secure communications are non-members (i.e., not members) of the secured network.

When an existing node (device) of the secure network wants to communicate with one or more other nodes (devices) in the network, it may ask the key server to create a key for a communications session between the nodes. The key server may create a specific key for the specific communications session and send it to the nodes identified as participating in the communications session. The key server may update the key periodically and redistribute it to the identified nodes of the communications session, or the nodes in a communications session may request an updated key from the key server at any time.

The key chosen for a communications session may be chosen by the key server in such a way that it is unrelated to any other communications session or node key within the secured network. Thus, if any node is compromised, the security of its active communications sessions may be compromised, but the security of the key server and the remainder of the secured network should remain intact. Any message sent during a communications session may be authenticated and optionally encrypted, using a monotonically increasing counter to prevent replay attacks. When a communications session is closed, the key server may consider the key associated with that session to be expired and no longer update the key.

When a node is removed from the secured network, the key server may cause all keys associated with that node to expire, and notify other members of the network of the expiration. This may assure that no intelligible authenticated communications can take place between a node that has been removed from the secured network and ones that remain.

FIG. 1 illustrates wireless instrumentation network 100 utilizing the network components. Key server 105 may act as a central key distribution center. The key server, acting as the centralized trust authority (or center) of the network, may be physically placed in a secured location to protect the key server from a direct physical attack due to its critical role in the development and maintenance of the network 100. Key server 105 may act as a dedicated platform whose only job is to provide keys when required. For security purposes, its connection to devices outside the network infrastructure may be limited to those necessary to perform key server related functionality. Its user interface may limit access to authorized administrators only.

Key server 105 may be connected to the wireless network 100 via gateway 110. The gateway 110 may be an interface between the wireless network nodes and the wired network components, such as the key server 105 and control system 115. Control system 115 may be the interface used to access the information being monitored by the wireless instrumentation network.

Liaison device (LD) 120 (i.e., keyfob, personal digital assistant (PDA), portable device, intermediary device, and/or the like) may connect directly to the key server 105 (i.e., key center, system security management center, centralized trust authority, key distribution center, secure trust center, and/or the like). The liaison device's role may be to act as a proxy for the key server 105 during device deployment. At first, a node entering the network does not necessarily share any keys with the secured network 100. Liaison device 120, physically proximate to a new node, may provide a bootstrap key (i.e., birth key, initial key, and/or the like), or a specific key, which is used to join the secured network. This key may be provided to the new node via a non-RF link or a weak non-exposed RF- or like-link. Ideally, for security reasons, an optical link or connection, or other type of link that cannot be eavesdropped at a significant distance, may be used for ease of deployment. Liaison device 120 may use this same non-RF link to communicate with the key server 105. Links 101, 102, 103, and 104 may be non-RF or otherwise not exposed to eavesdropping by adversaries and/or non-members or non-components of the secured network 100, except the entity to which the communication is directed or intended. Some or all of the links 101, 102, 103 and 104 may be distinct uses of the same link.

A secure communication mode or path may be a wireless channel or link (generally "exposed", which may mean that the mode or path is subject to eavesdropping by adversaries) where communications are authenticated and or encrypted or otherwise in another manner made unintelligible to eavesdroppers. A non-secure communication mode or path may be a non-wireless link or a non-exposed wireless channel or link where communications may be encrypted or not encrypted.

Leaf nodes 130 may be temporarily connected directly to liaison device 120 through an optical communications or other non-exposed or protected link 104. Leaf nodes 130 may be responsible for making measurements or applying actuator outputs and for sending and receiving the actual data. Leaf nodes 130 may be low-cost, low resource consuming nodes. They may have enough non-volatile memory to store a key encryption key (KEK) received from the key server 105 as well as to provide for firmware updates in the field. Leaf nodes 130 may also have a minimal external interface to allow an installer 135 to stimulate installation and to verify proper installation. This interface may be as simple as one button or electrical contact and one LED.

Between gateway 110 and leaf nodes 130 may be a mesh network 125 of infrastructure nodes (INodes). The infrastructure nodes may be line-powered relay nodes which communicate with leaf nodes 130 and other infrastructure nodes. The infrastructure nodes may serve as intermediaries for communications sessions that transfer information between leaf nodes 130 and one or more control systems. Infrastructure nodes may also act to make measurements or apply actuator outputs. Communications sessions, as well as the steps taken to form the secured network and begin a communications session, are further shown in FIG. 2 and FIG. 3.

Figure 2:
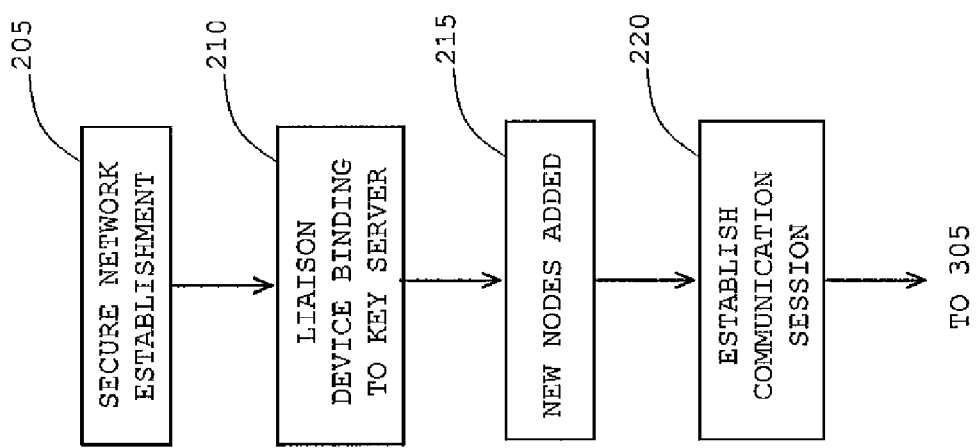
FIG. 2 is a flow chart illustrating the steps taken in the formation of a secured wireless instrumentation network.

FIG. 2 illustrates a flow chart of the steps taken in the formation of a new secured wireless instrumentation network 100. In step 205, the secured network 100 may be established. Establishing a new secured network may begin with the initialization of a key server 105. A configurable key server may be provided with a set of configuration parameters, such as a specification of how authorized administrators will authenticate themselves to the key server thereafter.

Configuration of the first key server 105 may initiate the new secured network 100. Networks in high-availability settings should have at least one other key server serving as a hot spare. The initial key server may be responsible for coordinating the replication of the critical security data to the other key server(s). The key server may be configured and attached to the network; then, as nodes (devices) are commissioned and join the secured network, the key server may add them to its database.

In step 210, the liaison devices 120 may be bound to the key server 105. The liaison device may act as a proxi for the key server to the nodes 130 and 125 being deployed in the field, by conveying cryptographic information from the key server useful for bringing them into the secured network 100.

In preparation, before deploying a set of new nodes, the liaison device 120 may be brought to the key server 105 and be temporarily connected to it by a non-exposed or protected technique (e.g., short-distance optical path, weak unexposed wireless link, or serial cable) 101. The key server 105 may be told which wireless network will be receiving new nodes. The key server may use its high-quality entropy source (for providing keys that are highly unpredictable) to generate a key generation key (KGK) which it transmits to the liaison device 120 and saves locally. Similarly the key server may transmit the network ID and the relevant network key. It is a common key provided to all trusted nodes that is used for controlling access to the network (and potentially other functions). The liaison device 120 may also zero its key generation counter. The liaison device may generate keys by encrypting its 128-bit counter using its 128-bit KGK, yielding a 128-bit result to be used as a new key. Other methods of generating KGKs without repetition are also usable.

Adding a node (step 215) to the secured network 100 may be accomplished by establishing a trust relationship between the new node and the network's key server 105 at the time of device deployment. In node authentication, assurance of the claimant's identity may usually require the claimant entity to provide corroborating evidence—credentials—to the verifier entity. In this case, each node may be introduced to the key server 105 when it is deployed, and a key is used for corroborating the node's identity to the key server (and vice versa).

To establish trust between the key server and a new node (e.g., new device), the human installer 135 may use a hand-held liaison device 120 to inject a bootstrap key (birth key) into the new node. Possession of the bootstrap key may be used to authenticate the new node and the key server 105 to each other. A temporary two-way non-exposed optical link 104 between the liaison device 120 and new node 130 may be used for key injection.

The installer 135 may press a button or close a contact on the liaison device 120 telling it to begin deployment. The liaison device may generate a bootstrap key for the new node by encrypting its counter using the KGK, then incrementing the counter. The liaison device 120 may also update its KGK in a manner not subject to reverse computation by again encrypting the counter using the current KGK, replacing the current KGK with the resulting value, and incrementing the counter again. Next, the liaison device may transmit the bootstrap key, network ID and the relevant network key to the new node. An error detecting or correcting integrity code may be included as well. The new node's optical transceiver may then send a sequence indicating successful reception of the bootstrap information.

The new node may turn off its optical transceiver, and then use RF to send a request-to-join message to the key server 105, authenticating its request with the bootstrap key, or a key based on the bootstrap key. The request-to-join message may include necessary networking information (i.e., the new node's long address, its temporary short address, and so forth). Some or all of this information may be encrypted through use of the bootstrap key, or a key based on the bootstrap key.

The key server 105 may have stored the original value of the liaison device's KGK, as well as recently used values of the KGK and the counter. The key server may generate a sequence of bootstrap keys, corresponding to the counter range after, and slightly before, the most recently used counter values. The key server may follow the same procedure used by the liaison device to generate a bootstrap key and a replacement key generation key, as well as incrementing the counter at each step. The key server 105 may deduce the bootstrap keys (and key generation keys) because it knows the starting state and procedure used by the liaison device 120, as well as the most recently deduced bootstrap key(s), if any. If no bootstrap key generated by this procedure authenticates the request-to-join message, the message may be discarded and the event logged. Once the request-to-join message is authenticated, the key server may trust the new node and may send it a key encryption key (KEK).

Once the new node has successfully received its key-encryption key (KEK), each of the node and the key server may use the shared KEK to corroborate the one's identity to the other. After this process, the key server 105 may trust the node 130 and the node may trust the key server. By extension, transitively through the key server's session key generation services, the node also may form trust relationships with other nodes 130 that are trusted by the key server 105.

Once the node is trusted, the process may continue to step 220 in which a communications session is established. Cryptographic keys may be associated with the session; different sessions may have different keys, and a single session may be re-keyed periodically if its duration or number of sent messages exceeds predetermined or configured thresholds. For example, each node may have a periodically-re-keyed permanent session with the key server 105 that is established when the node 130 joins the network 100; that session may persist for the operational life of the node, or be re-keyed at a much lower rate than other communications sessions.

A session which has two endpoints may be a unicast session; a session among a group of nodes 130 may be a multicast session. The cryptographic protection provided by the security protocol may apply uniformly to the entire session and all its endpoints. The use of symmetric (secret) key encryption with its requirement for shared keys may make it impossible to detect reliably the spoofing of one session endpoint by another endpoint of the same group session. Thus, sender authentication based only on use of a session key may be restricted to authenticating that the sender is an authorized member of the group session; there may be no consistent method for determining which one of the session's authorized senders is the actual sender of a given message.

When a node needs to establish a communications session with one or more others nodes in a session, the node 130 may request the session key (SK) for the session from the common key server 105, identifying the session by the session's assigned multicast address or identifying the session by the address of a unicast session's remote correspondent. At the first such request, the key server may validate the node's request to be a member of the session and, if acceptable, generate a new key for the session, escrow it locally, and send it to the requesting node. Each node 130 may share a unique key encrypting key (KEK) with the key server 105, and whenever the key server sends a session key to a node, the key may be encrypted under the node's KEK.

Each successive request by another node may result in the key server's validating that new node's request to be a member of the session and, if acceptable, retrieving the locally escrowed key and sharing it with that new requesting node encrypted under that node's own private KEK. Alternatively the key server may provide the session key to all of the trusted nodes that have been requested to be in a session as a result of the first request to establish the session.

Figure 3:
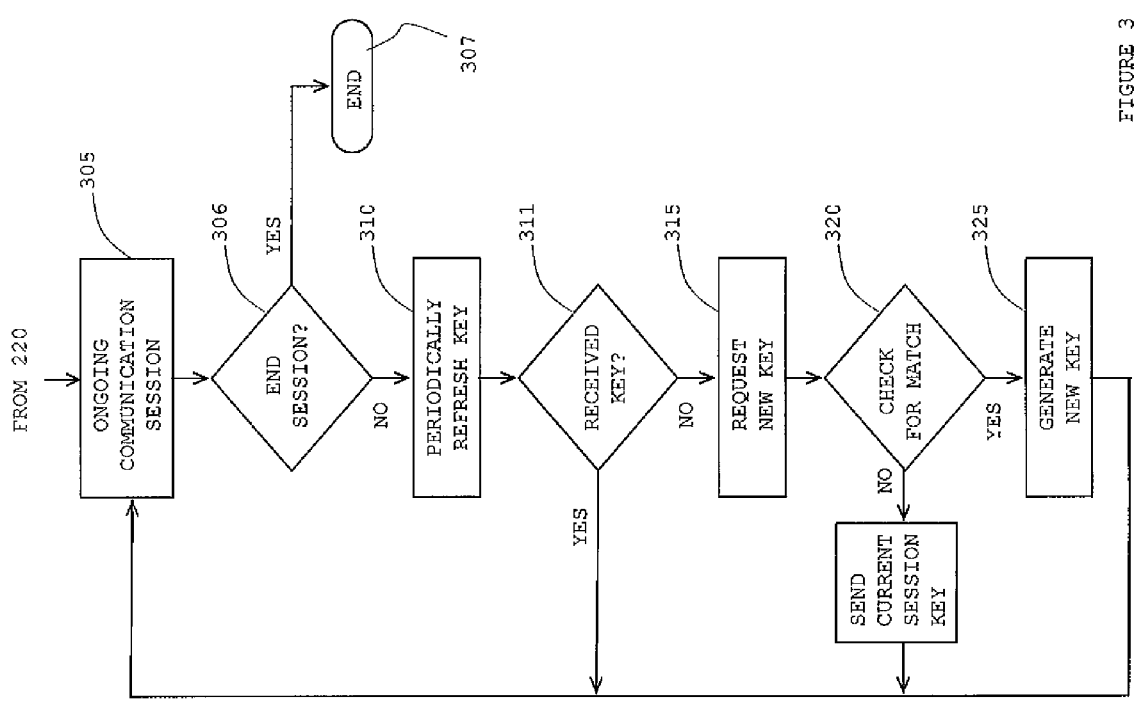
FIG. 3 is a flow chart illustrating the steps taken during a communications session with respect to a communications session key.

After the communications session is established at step 220, the process flow may continue to FIG. 3 as an ongoing session at step 305. If none of the nodes involved in the session has requested the session to be ended at stage or step 306, the process may continue to a key refresh stage 310. If one of the nodes involved does request a session to be terminated, which may be at stage 307, then the key server 105 may notify the involved nodes and cancel the session key.

Session keys should be refreshed relatively frequently during the lifetime of the session (e.g., daily, weekly, monthly).

This may serve to limit both the amount of data encrypted under a given key which is available to an attacker, and the time period during which a cracked key is useful for active attacks (e.g., tampering, forging, and spoofing).

Thus, in step 310, the key server may quasi-periodically send a new version of each session key to each participant in the given session; this may be called "re-keying". If the key server is unavailable, the nodes in the session may generate a new session key from the current one using a pre-established deterministic algorithm; this may be called "key update" (or "key parthenogenesis").

Re-key messages might not reach all participants in a session simultaneously. To accommodate this, during a key changeover, a node may maintain an "active" session key and an "alternate" session key. A message that was protected with the immediate next (or previous) version of the key may thus be validated and, if necessary, decrypted. Also, each message may include a 2-bit 'keyState' field so that correspondent node(s) are aware of and can synchronize their key-changeover status.

Each key may be accompanied by a two-part numeric value consisting of the key epoch and the self-update counter. The key epoch is the "number of re-keys" done by the key server since the start of the session. The self-update counter is a count of the number of times that a key update was applied to that key by the local node to reach the current key. The self-update counter is initialized to the value zero when a new session key is provided by the key server.

The key epoch may monotonically increase with successive keys generated by the key server.

Quasi-periodically, if the key server has not re-keyed a given session or the members have not received a key (step or stage 311), each member of a session may request a re-key for the session from the key server (stage 315). Each such request may be accompanied by an indication of the current key epoch in use by that requester; each such request may also start a repetitive timer that will trigger repeated re-keying requests to the key server 105, followed eventually by the backup key-update action if necessary.

Upon receiving such a re-key request, the key server may retrieve the last key escrowed locally for the session and do a comparison with the reported key epoch (step 320). If the reported key epoch corresponds to the current key for the session, the key server 105 may generate a new key (step 325), escrow it locally, and send the new key to the requester (encrypted under the requesting node's KEK), together with the update numeric key epoch of the new key. The key server also sends the new key and key epoch to the other members of the session protected using their respective KEKs. If the key epoch does not match, the key server 105 may return the current key for the session (encrypted under the requesting node's KEK), together with the current key epoch. Either way, the nodes that receive the new key restart their key timers.

When a node 130 that is participating in a communications session has received a new key for the session, it may indicate that status in the keyState field of all messages it sends on the session connection. Other nodes 130 in the session that receive those messages may note that a new session key exists and, if they have not already done so, may send a message to the key server 105 requesting the new session key for themselves.

Once the process returns back to the ongoing communications stage, step 305, the process may repeat. Again, the nodes 130 may request the communications session to be terminated, or the keys may again be refreshed.

Wireless systems provide many benefits but should be continuously secure. Such wireless security may depend on sharing cryptographic secrets (e.g., keys, certificates, authentications, and/or the like) which is the basis for establishing trust. Securely sharing an initial (birth) key between a system security management device (key server) and a newly installed device may be difficult or inconvenient for the device installer.

The system may include sharing a birth key between the key server (KS) and a newly installed device. An approach may assume that the installer has a keyfob, liaison device, portable device, intermediary, PDA, and/or the like, generically referred to in the following as a liaison device, that is trusted by the KS. There may be various options. A hand-held liaison device may either get a key from the new device and then give it to the KS, or get the key from the KS and give the key to the new device. Since there is no prior key shared only between the new device and the liaison device, the transfer between the liaison device and new device cannot be privately encrypted. (On the other hand, the messaging between the liaison device and the KS may be encrypted, since they may share a prior security relationship.) Unencrypted transfers between the new device and the liaison device should not be carried over a wireless link which is exposed to eavesdropping by an attacker. Rather, as a temporary measure during the process of sharing an initial secret (the birth key), a different non-exposed or protected link (e.g., optical link, wire connection or a very-short-range communications link) should be used. For example, a very low-power wireless RF connection (i.e., a 'whisper mode' not readily detectable or listenable by an adversary or attacker who is at a distance) may be used. Minimal requirements should be placed on a device being installed in order to minimize the impact on device cost.

The technique may be a low-cost, low-impact way of conveying keys between a central key distribution center and a low-cost device that normally uses wireless communications which can be readily eavesdropped.

Figure 4:
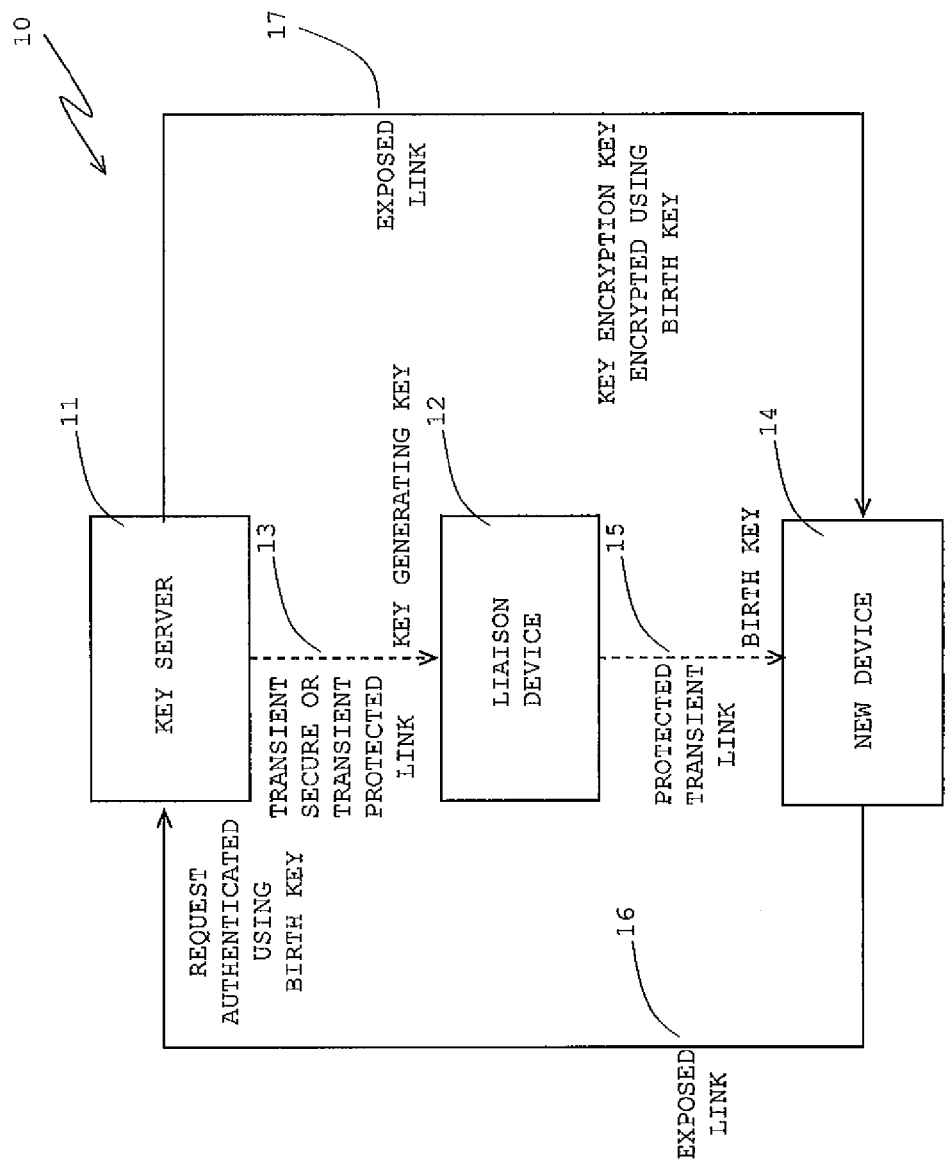

There may be several approaches for realizing the technique in the secure wireless network 100. As to whether one approach is better than another may depend on circumstances relative to an application of the approach. As to a first approach 10, schematically outlined in FIG. 4, in a preparation step, a key server (KS) 11 may provide a key generation key (KGK) to a physically proximate liaison device 12 via an infrared (IR) link or other optical link 13. Liaison device 12 may be a portable device, PDA, intermediary device, keyfob, liaison device, or the like. There may be numerous liaison devices 12 operating with the secure network. Link 13 may be an optical link, wire connection, low-power RF, or other link that is protected against eavesdropping from a distance. It may also be a secure link of any type, such as an internet virtual private network (VPN) connection, where the security is dependent on secrets already known to KS 11 and liaison device 12.

The KS 11 may use a high-quality entropy source for the keys it generates. A counter in the liaison device 12, used in the device's key generation algorithm, may be zeroed or initialized with a random value provided by KS 11 during a preparation step. The initial counter value, the KGK, and the algorithm used by the liaison device 12 for key generation must be known by the KS. At each key injection, the liaison device 12 may be brought to a new device 14. The liaison device 12 may encrypt its counter value with the KGK to generate an individual bootstrap key (i.e., birth key or boot key) for (each) new device 14. The liaison device 12 may then increment the counter value. The liaison device 12 may next encrypt a new counter value with the KGK, thereby generating another key KGK', with which the liaison device 12 replaces its KGK value. The liaison device 12 may then increment the counter value a second time. A bootstrap (birth) key (BK) may be transmitted by non-exposed or protected link 15 (e.g., generally a short-range temporary optical link or electrical connection) to the new device 14. The new device 14 may transmit a message to the KS 11 via an exposed RF channel 16, asking to join the secured network. The message may be authenticated using the birth key (BK). The KS 11 may authenticate based on trials of likely BK values, using its knowledge of recent values of the counter, the KGK and the algorithm that are used by the keyfob(s) (or liaison devices) that it has initialized. After the authentication succeeds, revealing a BK value to the KS 11, the KS may generate a KEK, encrypt it with the BK, or a key derived from the BK, and send it back to new device 14 via an exposed RF channel 17. Upon receipt of the reply message, device 14 may use the BK, or one or more keys derived from the BK, to authenticate the message and decrypt its contained KEK, after which device 14 now has its unique KEK. The liaison device 12 could simply keep a list of keys generated in advance by the KS 11 rather than generating them. The liaison device 12 should securely erase the keys as they are used. Erasing the previously used key memory may involve repeatedly writing over that memory location with pseudo-random data.

The liaison device 12 may have limits on the time that its series of KGKs is valid, or on the number of birth keys that can be generated by its series of KGKS, so that the information in the keyfob or liaison device at any moment is only valid for a certain period of time or number of generations of new birth keys.

The liaison device 12 (or the new device 14) could include a display such as an LCD that allows a tag name or functional ID to be viewed and selected for use by the device 14 at the same time as it gets a birth key. The liaison device 12 may get a tag name list from the KS 11. The liaison device 12 may be used to insert information describing the device's location or intended function (within the plant) into the device 14 along with the birth key (i.e., BK). The device 14 may accept the key and other information only as a pair from the liaison device 12 to improve the security of accepting that other information.

The approach 10 may be described as a system or network 100 for sharing secret keying information between a device of a system employing cryptographically or physically (or both) secured communications and a device 14 not yet a party to the secured communications. The approach 10 may apply to a system of devices with permanent or intermittent secured communication mechanisms between and among subsets of the devices (of a system), such that one or more devices may function as a key distribution center (key center 11 or key server 11) which can generate and share secret keying information with other devices of the system via the communications mechanism. A secured communications path may exist at least intermittently between any device and at least one key center 11 device using the secured communications mechanism. Some of the devices may be capable of secure communications using an exposed RF channel subject to eavesdropping by adversaries.

A portable device or liaison device 12 may be capable of communication with a key center or server 11 via the secured communications approach (protected link 13) of the system 100 or with transmission over distances on the order of meters or less using wired or wireless communications techniques (such as an exposed link 13) that are difficult to detect at greater distances. There may be another device 14 intended for inclusion in the prior system of devices ("the new device"), such that the device's primary mode of communications is an exposed communications link subject to eavesdropping by adversaries. This communications link may require protection against an attack on the communications carried on that link. The new device 14 may have an additional short-range optical or electrical means of reception from a physically proximate portable device.

To introduce a new device to the secured system, one may begin by having a key center 11 generate secret key generation information with high entropy (unpredictability). The key center 11 may communicate that secret key generation information to a portable device 12, using either physical or cryptographic techniques to secure that communication. At each instance of its use for commissioning a new device, that portable device may use its current secret key generation information to generate new keying material for the new device in a mathematical manner that makes reverse inference of the secret key generation information from the new keying material computationally infeasible. Then, the new keying material may be communicated to the new device 14 through the non-exposed or protected link 15 for which the new device has corresponding reception means. The new keying material may be erased completely from the memory of the liaison device. A cryptographically-strong function may be applied to the current secret key generation information, replacing that information with the output of that cryptographically-strong function in a manner that creates a one-way function (without an inverse that is readily computed from the information remaining after this procedure).

On receipt by one of the system's key centers of communications from the new device 14, the key center 11 can sequence through the numerically-small sequence of new keying material sets that the portable device 12 could have generated, attempting to cryptographically verify the received message using each set until the proper set is detected. The key center 11 may also verify by a subsequent cryptographically-protected message exchange with the new device 14 that the correct set of keying material has been inferred.

The short-range communications of secret keying information from the portable device 12 to the new device 14 may use a non-exposed or protected link such as a wired connection or an optical link 15. The optical link between the portable device and the new device may include an LED within the portable device, an appropriate photo-reception means within the new device, and free-space transmission from the LED to nearby photo-reception means. The photo-reception means may be an LED used in a reception mode as disclosed in U.S. Pat. No. 7,072,587, issued Jul. 4, 2006, which is hereby incorporated by reference. The optical link 15 between the portable device 12 and the new device 14 may include, in lieu of free-space transmission from the LED to nearby photo-reception device, a multi-mode fiber optic medium (segment) with mechanical connectors or couplers or shrouds on at least one end of the fiber optic segment for mechanically affixing the fiber optic segment to either the portable device or the new device, or both.

The information signaled over the optical link 15 between the portable device 12 and the new device 14 may also use a forward error correcting code (FEC). The short-range communications of secret keying information from the portable device to the new device may use wireless transmission at transmit power levels much lower than those of the system's normal wireless communications.

Figure 5:
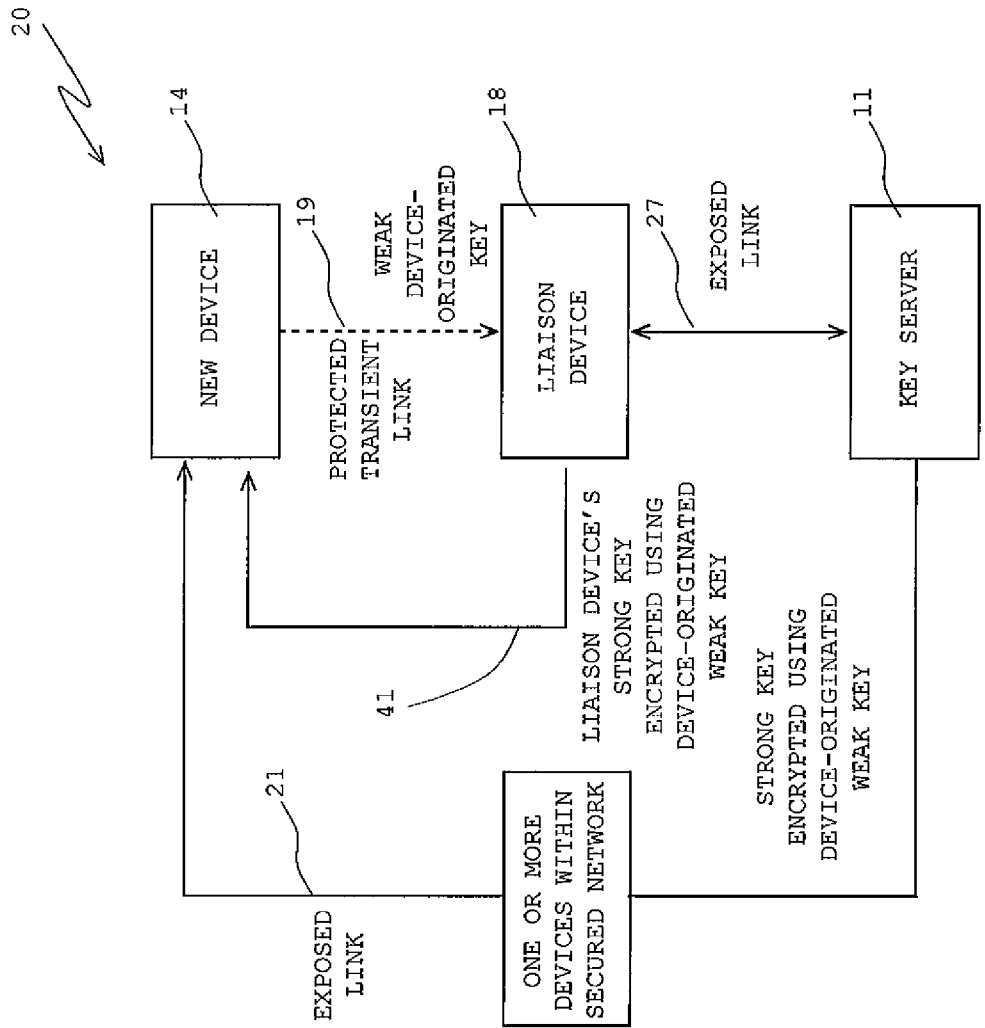

As to an approach 20 in FIG. 5, a liaison device 18 may send a good quality (high entropy) encrypted key via an exposed RF channel 41 while reading a lower quality key from a device 14 via its locally-accessible LED link 19.

Liaison device 18 may be a keyfob, portable device, intermediary, personal digital assistant, or the like. Link 19 may be another kind of optical link, wire connection, low-power RF, or other non-exposed or protected link. In a minimum configuration, the new device 14 may need just an LED (in addition to the radio system to be secured). An on/off LED from the device 14 may be controlled based on a manufactured-in or internally-generated key (or combination thereof). The LED may emit this key during the process of installing and commissioning device 14. One may use an exposed RF channel 41 and a non-exposed or protected optical link 19 to get the key installed. Essentially one may encrypt the liaison device generated strong key via XOR (or similarly combine) the strong key with the LED generated state bit by bit. This is secure because the attacker would not have access to the data communicated over the non-exposed or protected link 19 by the LED. One could also run the liaison device's radio transmitter 41 in very low power "whisper" mode for additional risk mitigation. This may assume that the device 14 has limited entropy keys and liaison device 18 has access to good quality or strong keys from the key server 11 via a secure exposed link or conveyance 27.

This approach 20 may be described as a system 100 for sharing secret keying information between a device of a system employing cryptographically or physically (or both) secured communications and a device 14 not yet a party to the secured communications. The approach may be for a system 100 of devices with permanent or intermittent secured communications mechanisms between and among subsets of the devices ("the system"), such that one or more devices may function as a key distribution center ("key center 11") which can generate and share secret keying information with other devices of the system via the communications mechanism. A secured communications path may exist at least intermittently between any device and at least one key center 11 device using the secured communications mechanism. Some of the devices may be capable of secure communications using an exposed channel subject to eavesdropping by adversaries.

At least one of the devices capable of communications on the exposed channel may be portable ("portable device 18") and be capable of optical reception from a physically proximate transmitting device. Another device 14 intended for inclusion in the prior system of devices ("the new device") may have a primary mode (i.e., exposed) of communication which is subject to eavesdropping by adversaries, and thus that mode may require protection against attack. The device 14 may have an additional short-range optical mode of transmission 19 to a physically proximate device 18 that is inherently non-exposed or protected by limitations on its reception at a distance.

The approach for combining within one of the system's portable devices may include secret keying information with high entropy (unpredictability) generated by a key center 11 within the system and communicated securely via the bidirectional link 27 to that portable device 18. It may also include secret keying information of lower entropy generated by the new device 14 and signaled by that local non-exposed or protected optical mode of transmission 19 and an intervening optically conductive medium to the portable device 18, and communicating that information from the portable device 18 back to the new device 14 via a link 41 such that the communicated combination is secured by the lower entropy secret keying information provided to the portable device 18 by the new device 14.

Alternatively, the liaison device 18 may provide the weak key to the key server 11 via exposed link 27. The key server may encrypt the strong key using the weak key. Link 21 may be a normally-exposed wireless channel, and the communications of secret keying information from the key server 11 to the new device 14 via that wireless channel 21 may be a direct or indirect wireless transmission using transmit power levels (i.e., "whisper" mode) much lower than those of the system's normal wireless communications, thereby providing an instance of non-exposed or protected communication on the normally-exposed wireless channel. The communication of secret keying information from the key server 11 to the new device 14 may use some of the system's secured communications links in addition to the exposed channel 21.

The optical link 19 between the new device 14 and the portable device 18 may include an LED within the new device, an appropriate photo-reception mechanism within the portable device 18, and free-space transmission from the LED to nearby photo-reception means. The optical link 19 between the new device 14 and the portable device 18 may include, in lieu of free-space transmission from the LED to nearby photo-reception means, a multi-mode fiber optic medium (segment) with mechanical connectors or couplers or shrouds on at least one end of the fiber optic segment for mechanically affixing the fiber optic segment to either the portable device 18 or the new device 14 or both. The information signaled over the optical link 19 between the new device 14 and the portable device 18 may use a forward error correcting code.

Figure 6:
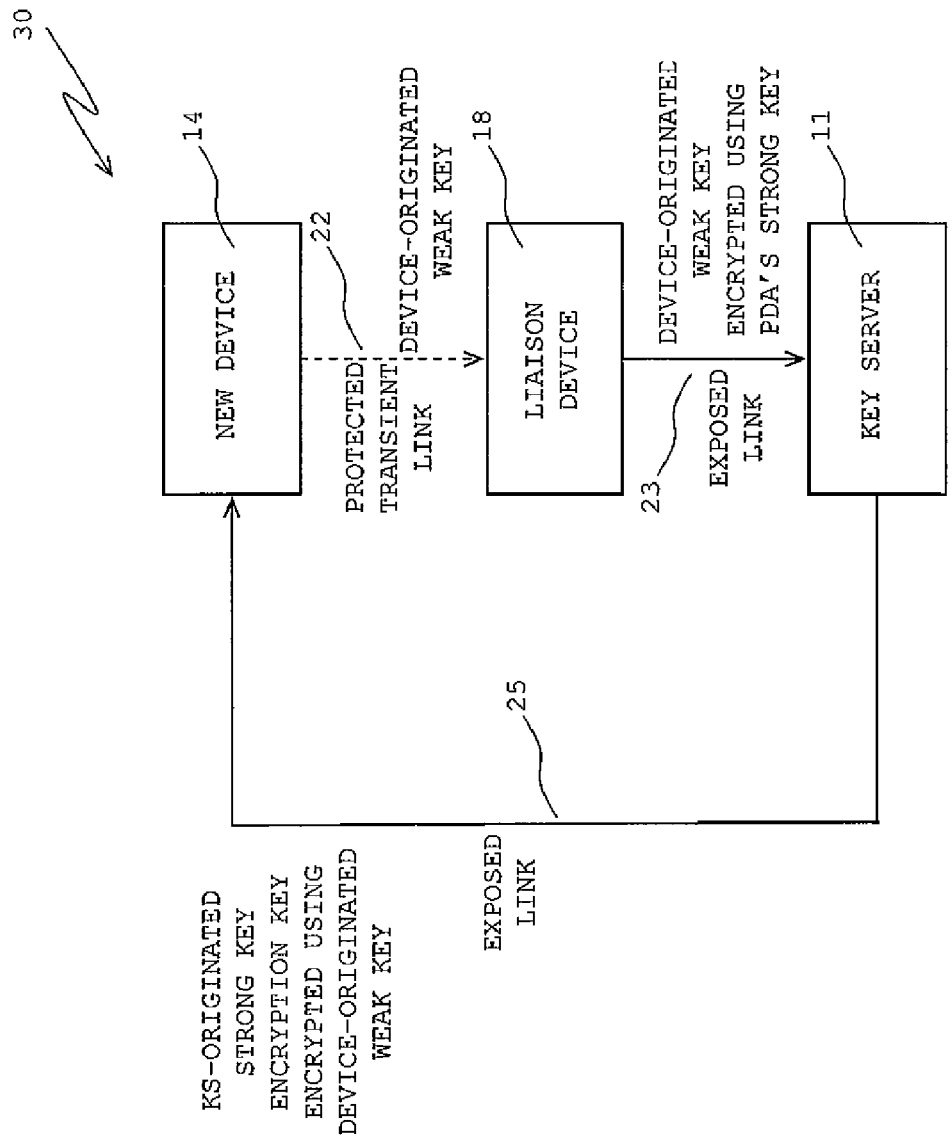

As to another approach 30 in FIG. 6, a weak random key (as it may be generally difficult to generate good keys) in a device 14 may be sent via an LED (non-exposed or protected link 22 and using forward error correcting coding) to liaison device 18. Liaison device 18 may be a keyfob, portable device, intermediary, specific kind of liaison device, or the like. Link 22 may be another kind of optical link, wire connection, low-power RF, or other non-exposed or protected link. Liaison device 18 may be linked securely (e.g., using encryption) to a KS 11 via exposed RF channel 23. Liaison device 18 may send the weak key received from device 14 to a key server (KS) 11 via the link 23. The KS 11 may generate a good high-entropy key for device 14, encrypt it under the weak key received through link 23, and forward the encrypted key via an exposed RF channel 25 to the device 14 as its key encryption key. One or more other devices of the secured network may assist in this forwarding, potentially including liaison device 18 itself acting as a hub. With this approach liaison device 18 need not be aware of the key encryption key sent to the device, so it might not itself need to be so carefully protected a device.

This approach 30 may be described as a system for sharing secret keying information between a device of a system employing cryptographically or physically (or both) secured communications and a device not yet a party to the secured communications network 100. There may be a network of devices with permanent or intermittent secured communication mechanisms between and among subsets of the devices ("the system"), such that one or more devices may function as a key distribution center ("key center 11") that can generate and share secret keying information with other devices of the system via the communications mechanism. A secured communications path may exist at least intermittently between any device and at least one key center 11 device using the secured communications mechanism. Some of the devices may be capable of secure communications using an exposed channel subject to eavesdropping by adversaries.

At least one of the devices capable of communications on the exposed channel may be portable ("portable device 18") and have a non-exposed or protected optical mechanism 22 of reception from a physically proximate transmitting device. A device 14 intended for inclusion in the prior system of devices ("the new device 14") may have a primary mode of communication (exposed channel 25) which is subject to eavesdropping by adversaries, and thus that mode may require protection against an attack. The device 14 may have an additional short-range optical mode (non-exposed or protected link 22) of transmission to a physically proximate device, such as device 18.

This approach may include having the new device 14 generate secret keying information of low to moderate entropy, and having the new device 14 signal or transmit that keying information by the optical mode of transmission 22 via an intervening optically conductive medium to one of the system's portable devices 18. It may also include having that same portable device 18 securely communicate that low- to moderate-entropy secret keying information to one or more of the system's key centers 11 via an exposed channel 23, and having that key center 11 generate secret keying information with high entropy (unpredictability). Further, it may include having that key center 11 secure that new high-entropy secret keying information with the low- to moderate-entropy secret keying information originated by the new device 14, and having that key center 11 securely communicate that now-secured keying information back to one or more devices in the system capable of communications with the new device 14 via an exposed channel 25. It may also include having at least one of those receiving devices forward the secured keying information to the new device 14 via the exposed channel.

The final receiving device of the system that forwards the secured keying information to the new device 14 via an exposed channel may be one of the trusted nodes in the system. The exposed channel may be a wireless channel 25, and the communications of secret keying information from the one of the trusted nodes in the system to the new device 14 via that wireless channel 25 may use transmit power levels much lower than those of the system's normal wireless communications, thereby rendering channel 25 into a non-exposed or protected link for this single instance of communication.

The optical link 22 between the new device 14 and the portable device 18 may include an LED within the new device, an appropriate photo-reception means within the portable device 18 and free-space transmission from the LED to nearby photo-reception means. The optical link 22 between the new device 14 and the portable device 18 may also include, in lieu of free-space transmission from the LED to nearby photo-reception means, a multi-mode fiber optic medium (segment) with mechanical connectors or couplers or shrouds on at least one end of the fiber optic segment for mechanically affixing the fiber optic segment to either the portable device 18 or the new device 14, or both. The information signaled over the optical link 22 between the new device 14 and the portable device 18 may use a forward error correcting code.

Figure 7:
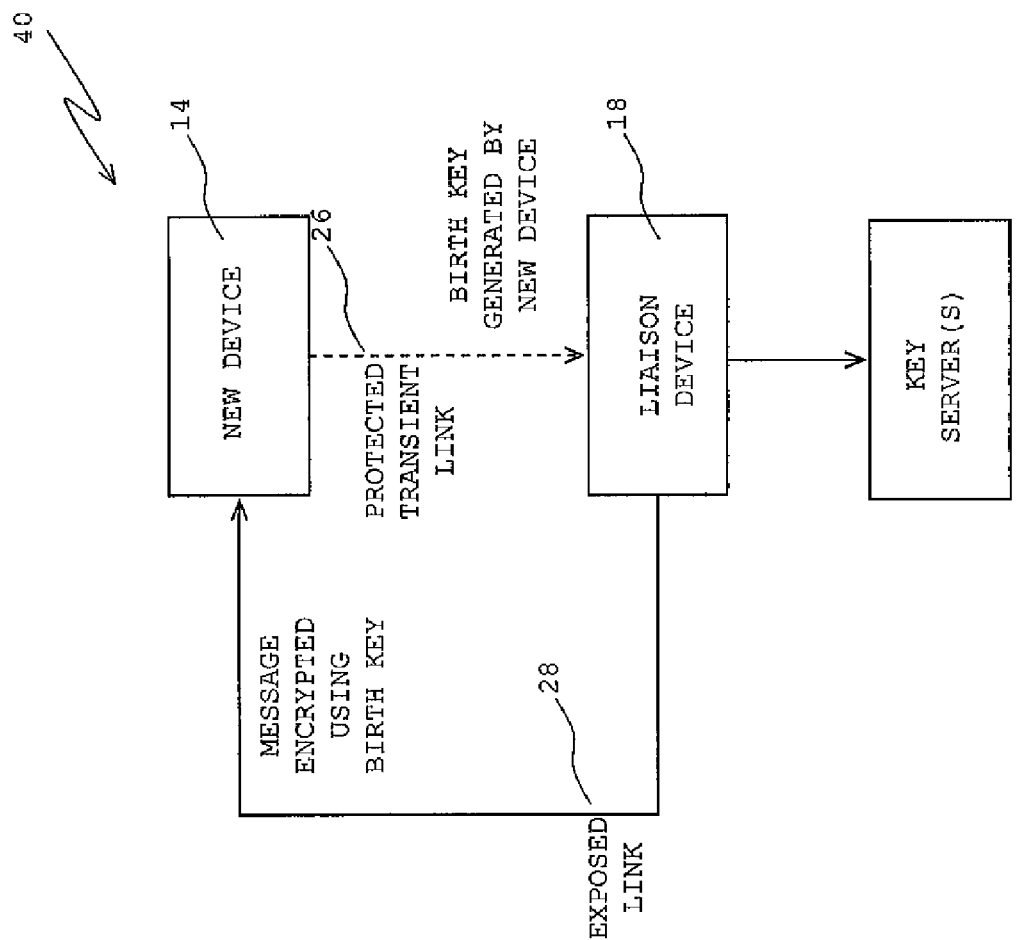

As to another approach 40 in FIG. 7, liaison device 18 may read a key sent by the device 14 via its LED (protected channel 26). Liaison device 18 may be a keyfob, portable device, intermediary, a specific kind of liaison device, or the like. Link 26 may be another kind of optical link, wire connection, low-power RF, or other non-exposed or protected link. Device 14 may have a manufactured-in good entropy random number which may be used with an install-counter by its encryption algorithm to generate birth keys—one for each new installation of device 14. New device 14 may send a random-number-generated birth key through an LED port with a forward error correcting code (FEC) via a non-exposed or protected link 26. The FEC may be used to assure that the one-way transmission is correctly received by liaison device 18. Local random entropy should be mixed in with the manufactured-in key before the key is sent to liaison device 18 to avoid an attack on the key manufacturing process. Then, liaison device 18 may send a message to the new device 14, encrypted under the birth key received from new device 14, via exposed RF link 28.

This approach 40 may be described as a system for sharing secret keying information between a device of a system employing cryptographically or physically (or both) secured communications and a device 14 not yet a party to the secured communications network or system 100. There may be a system of devices with permanent or intermittent secured communications mechanisms between and among subsets of the devices ("the system"), such that one or more devices may function as a key distribution center ("key center 11") which can generate and share secret keying information with other devices of the system via a secured communications mechanism. A secured communications path may exist at least intermittently between any device and at least one key center 11 using the secured communications mechanism. Some of the devices may be capable of communications using an exposed channel subject to eavesdropping by adversaries.

At least one of the devices capable of communications on the exposed channel may be portable ("portable device 18") and have an additional optical link 26 of reception from a physically proximate transmitting device. This may be a non-exposed or protected link due to the physical restrictions of the optical signaling mechanisms. A device 14 intended for inclusion in the prior system of devices ("the new device 14") may have a primary exposed mode 28 of communication which is subject to eavesdropping by adversaries, and thus that mode may require protection against attack. The device 14 may have an additional short-range optical mode 26 of non-exposed or protected transmission to a physically proximate device such as portable device 18.

This approach 40 may include having the new device 14 generate secret keying information from high entropy secret keying information introduced into the new device 14 prior to deployment, and low- to moderate-entropy secret keying information acquired by the new device 14 from its environment, and a count of the number of times that the device has generated such secret keying information. It may also include having the new device signal or transmit that generated keying information by the optical mode (non-exposed or protected link 26) of transmission via an intervening optically-conductive medium to one of the system's portable devices 18, and having that same portable device 18 securely communicate the secret keying information, to one or more of the system's key centers 11.

The optical link 26 between the new device 14 and the portable device 18 may include an LED within the new device, an appropriate photo-reception means within the portable device, and a link 26 with free-space transmission from the LED to a nearby photo-reception mechanism. The optical link 26 between the new device 14 and the portable device 18 may also include, in lieu of free-space transmission from the LED to nearby photo-reception means, a multi-mode fiber optic medium (segment) with mechanical connectors or couplers or shrouds on at least one end of the fiber optic segment for mechanically affixing the fiber optic segment to either the portable device 18 or the new device 14, or both. The information signaled over the optical link 26 between the new device 14 and the portable device 18 may incorporate a forward error correcting code. The key server may communicate securely using the Birth key with the new device 14 to replace the BK with a high entropy KEK as a further security measure.

Another approach 50 in FIG. 8 shows a user 31 who may implement a phone connection 32 and a secure Internet connection 33 to provide a key from a new device 14 to a key server 11. The new device may provide, for example, a series of hexadecimal digits to the user 31. These digits (which may be a manufactured-in number or code within new device 14, or other source of digits) may be conveyed as seed material for an encryption key in a non-exposed or protected manner 34 via an LED in the form of a code conveyed by a blinking light. (For example, a short pulse could represent the value 0 and a longer pulse the value 1, with pauses every four pulses for synchronization, thereby conveying one hexadecimal digit in each cluster of pulses.) The user 31 may read the digits from the LED blinks of light and enter them with keystrokes (non-exposed or protected link 35) into a keyboard or pad of a wireless telephone 32. Wireless telephone 32 may be connected to the public switched telephone network (PSTN) via a secured wireless connection 36. The output of the PSTN connection 36 may provide a secure transmission of the information, which is the new device key, from the PSTN 33 to a connection or interface 37 for the key server 11. The non-exposed or protected connection or interface 37 may be similar to connection 36. Instead of the PSTN 33, the new device key information may be conveyed from the phone 32 via a secure wireless data link between the phone and the key server 11. This secure wireless data link may traverse the Internet, and may use SSL (secure socket layer), a Java application, or other approach for providing secure transmission of the digit key information over the Internet or an intranet.

After receipt of the digit key that originated with new device 14, the key server 11 may send a birth key, or a key encryption key, encrypted with or using the digit key, to the new device 14 via an exposed channel 38, such as an RF channel.

Other approaches, including variations of the approaches included herein, for secure provision of birth keys to new devices 14 to be brought in to a secure communications system or network of devices may be utilized.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A secure wireless instrumentation network system comprising:
   a secure trust center; and
   one or more of member wireless devices; and
   wherein:
   the secure trust center provides a birth key (BK) via a protected link to a non-member wireless device;
   the non-member wireless device uses the BK key to provide a first secure link which is used to send a request for membership to the secure trust center requesting that the non-member wireless device become a member wireless device;
   provided that the secure trust center authenticates the request for membership, the secure trust center considers the non-member device to be a member device;
   the protected link is not cryptographically protected;
   the protected link has limited exposure to eavesdropping;
   each secure link is cryptographically protected using a unique cryptographic key from the secure trust center; and
   the secure trust center maintains a record of cryptographic keys.

2. The system of claim 1, wherein the secure trust center sends a key encryption key (KEK) via the first secure link to the device.

3. The system of claim 2, wherein:
   each of one or more member wireless devices uses its KEK to provide a second secure link with the secure trust center that replaces the first secure link with the secure trust center; and
   the KEK of each of one or more member wireless devices is different from the KEK of another one or more member wireless devices.

4. The system of claim 3, wherein:
   the secure trust center provides a session key (SK) to two or more member wireless devices, via each second secure link respectively of each of the two or more member wireless devices;
   the SK provided to the two or more member wireless devices is used to provide a third secure link between the two or more wireless devices; and
   each instance of the BK, KEK and SK comprises data that is unpredictable by an attacker.

5. A secure wireless instrumentation network system comprising:
   a secure trust center;
   one or more of member wireless devices; and
   a liaison device; and
   wherein:
   cryptographic information is transferred from the secure trust center via a first protected link or a first secure link to the liaison device;
   the liaison device transfers a birth key (BK) via a second protected link to a non-member wireless device;
   the non-member wireless device uses the BK from the liaison device to provide a second secure link which is specific to that device and which is used to send a request for membership to the secure trust center requesting that the non-member wireless device become a member wireless device;
   the first and second protected links are not cryptographically protected;
   the first and second protected links have limited exposure to eavesdropping; and
   the first and second secure links are cryptographically protected with a unique cryptographic key from the secure trust center.

6. The system of claim 5, wherein:
   provided the secure trust center authenticates the request for membership, the secure trust center now considers the non-member device to be a member device and sends a key encryption key (KEK) via the second secure link to the device;
   each of one or more member wireless devices uses the KEK to provide a third secure link with the secure trust center which is specific to that device and which replaces the second secure link with the secure trust center; and
   the KEK of each of one or more member wireless devices is different from the KEK of each of the other one or more member wireless devices.

7. The system of claim 6, wherein:

the secure trust center provides a session key (SK) to a pair of two or more member wireless devices;
the SK is unique for each pair of devices;
the SK is used to provide a fourth secure link between the two or more wireless devices and which fourth secure link is specific to that pair of devices;
the SK is provided either via each third secure link respectively of each of the two or more member wireless devices, or via a device-specific secure link between the secure trust center and each member device that is based on a unique session key for the device that is delivered and managed using the third secured link;
each instance of the KGK, BK, KEK and SK comprises data that is unpredictable by an attacker; and
the secure trust center maintains a record of one or more KGKs, BKs, KEKs and/or SKs.

8. The system of claim 6, wherein:
a key generation key (KGK) is transferred from the secure trust center via a first protected link or a first secure link to the liaison device;
the BK from the liaison device to the non-member wireless device is derived from the KGK from the secure trust center to the liaison device by the liaison device;
the liaison device is portable;
the liaison device comprises a BK memory;
the liaison device securely erases the BK memory after providing a BK to a non-member device;
the liaison device, after providing each BK, uses a one-way function to transform the KGK into a new KGK that is used to generate the next BK;
each KGK is securely erased after the respective KGK is used to generate a BK and a new KGK; and
the one-way function is such that it is computationally very difficult to derive any of the erased KGKs from the current KGK.

9. The system of claim 7, wherein either the third secure link or the session between the device and the secure trust center is used to manage SKs.

10. The system of claim 7, wherein:
the SK is updated with a new key that is unpredictable by an attacker;
a condition for the SK to be updated comprises a configurable period between SK updates; and
the configurable period is at least partially a function of time lapsed during a present SK, a number of messages sent under the SK, an amount of data sent under the SK, a request by the secure trust center, or a request by a member wireless device.

11. The system of claim 7, wherein the secure trust center can request that a member wireless device stop using a secure link between the member and a previously trusted device that is no longer considered a member by the secure trust center.

12. The system of claim 9, wherein the secure trust center sends a copy of each KEK encrypted under a backup key to another secure trust center.

13. A method for establishing a secured wireless instrumentation network, comprising:
providing a key server;
providing a liaison device;
conveying cryptographic information from the key server to the liaison device;
transferring the cryptographic information or derivations thereof that originated at the key server from the liaison device to a new node;
utilizing the cryptographic information to authenticate communication between the new node and the key server, to indicate that the new node has authorization to be included in the secured network; and
maintaining a record of the cryptographic information at the key server; and
wherein the transferring the cryptographic information uses a communication path not susceptible to interception at a distance.

14. The method of claim 13, further comprising transmitting a key encryption key (KEK) from the key server to the new node for future communication purposes, encrypted and authenticated using prior shared cryptographic information.

15. The method of claim 13, wherein:
the liaison device uses a one-way function to derive new cryptographic information;
the one-way function has a property such that it is computationally very difficult to derive any previously derived cryptographic information using current cryptographic information; and
the liaison device, after delivering some of the current cryptographic information to a new node, and after generating a next set of cryptographic information, securely erases the current cryptographic information including cryptographic information transmitted to the new node thereby reducing a threat to the system should the liaison device be captured by an attacker.

16. The method of claim 14, further comprising:
establishing a secured communication session between two or more nodes requesting to communicate with each other; and
wherein the secured communication session has one or more of the session attributes of message content confidentiality, message content integrity, message source authenticity, and message sequence integrity.

17. The method of claim 16, wherein the establishing a secured communication session comprises the key server creating a unique session key (SK) specifically for use between the two or more nodes requesting to communicate with each other, and securely communicating the SK with those nodes via prior shared cryptographic information such as previously-shared individual KEKs or via a device-specific secure link between the key server and each member device that is based on a unique session key for a device that is delivered and managed using communications secured using the KEK.

18. The method of claim 17, further comprising an updating the SK key periodically and redistributing the SK to two or more nodes requesting to communicate with each other.

19. The method of claim 18, wherein a period of time passing between each updating of the SK is configurable.

20. The method of claim 18, wherein an the updating of the SK occurs as a result of events such as a passage of time, a number of messages sent using the SK, a total amount of data sent using the SK, or a requested update by the key server or an authorized node.

21. The method of claim 18, further comprising the key server removing one or more no-longer-trusted devices from participation in a secured communication session by individually and securely sending to each trusted device a request that the trusted device cease using the current SK in the session, and providing a new SK key to be used in a new session.

22. A secure wireless network system comprising:
a wireless network;
a key server linked to the wireless network; and
a liaison device that serves to transport unique secure information from the key server to new nodes; and
wherein:
the new nodes are able to connect to the liaison device;

the key server is configured to authenticate the new nodes on the wireless network, transmit and assign a key encryption key (KEK) to each of the new nodes for communication purposes, and/or maintain a record of KEKs assigned to the new nodes;

the liaison device at one time is connected to the key server and at later times is connected to the new nodes, the liaison device configured to receive the unique secure information from the key server and transmit the unique secure information or derived unique secure information to the new nodes via a protected link; and the new nodes are configured to receive the unique secure information from the liaison device, utilize the unique secure information for verification purposes, and receive the key encryption key for future secure communication with the key server.

23. The system of claim 22, wherein the new nodes are further configured to transmit a request to the key server requesting the establishment of a communication session between the requesting new node and one or more authenticated nodes.

24. The system of claim 23, wherein:

the key server is further configured to receive the request, create a session key (SK) specific to the request, and transmit the SK to each of the nodes involved in the session using secure communications with the key server; and the key server is further configured to update the SK periodically and transmit the updated SK key to each of the requesting new nodes involved in the session.

25. The system of claim 24, wherein the key server is further configured to detect or be informed of a possible compromise of network security at a particular device and is configured to request trusted member wireless devices halt any sessions with the compromised device resulting in an ending of the communication sessions with the compromised device.

* * * * *